United States Patent [19]
Pieper et al.

[11] Patent Number: 6,085,551
[45] Date of Patent: Jul. 11, 2000

[54] METHOD AND APPARATUS FOR MANUFACTURING HIGH MELTING POINT GLASSES WITH VOLATILE COMPONENTS

[75] Inventors: Helmut Pieper; Joachim Matthes, both of Lohr am Main, Germany

[73] Assignee: Beteiligungen Sorg GmbH & Co. KG, Lohr am Main, Germany

[21] Appl. No.: 09/054,294

[22] Filed: Apr. 2, 1998

Related U.S. Application Data

[63] Continuation-in-part of application No. 08/818,002, Mar. 14, 1997, abandoned.

[51] Int. Cl.[7] .................... C03B 5/18; C03B 5/16; C03B 5/00
[52] U.S. Cl. .............. 65/134.1; 65/135.1; 65/135.7; 65/135.8; 65/335; 65/339; 65/346; 65/347; 373/30; 373/35; 373/122; 431/11; 432/195; 432/219
[58] Field of Search ................ 65/134.1, 134.4, 65/135.1, 135.6, 135.7, 135.8, 335, 336, 337, 339, 346, 347; 431/11; 432/195, 210, 248, 219; 373/29, 30, 35, 41, 86, 122, 129

[56] References Cited

U.S. PATENT DOCUMENTS

| | | | |
|---|---|---|---|
| 1,944,855 | 1/1934 | Wadman | 65/347 |
| 2,800,175 | 7/1957 | Sharp . | |
| 2,890,547 | 6/1959 | Lyle . | |
| 3,353,941 | 11/1967 | Hanks et al. . | |
| 3,373,007 | 3/1968 | Ticknor | 65/347 |
| 4,001,001 | 1/1977 | Knavish et al. | 65/337 |
| 4,882,736 | 11/1989 | Pieper . | |
| 4,932,035 | 6/1990 | Pieper . | |
| 5,766,296 | 6/1998 | Moreau . | |

FOREIGN PATENT DOCUMENTS

| | | |
|---|---|---|
| 0 086 858 | 8/1983 | European Pat. Off. . |
| 0 317 551 B1 | 6/1992 | European Pat. Off. . |
| 0 410 338 B1 | 3/1994 | European Pat. Off. . |
| 0 763 503 A2 | 3/1997 | European Pat. Off. . |
| 2 737 487 | 8/1995 | France . |
| 1 210 520 | 2/1966 | Germany . |
| 2 034 864 | 3/1973 | Germany . |
| 39 03 016 C2 | 2/1989 | Germany . |

OTHER PUBLICATIONS

"ABC Glas" by Dr.–Ing. Hans–Joachim Illig, p. 36.
"Glaschemie" by Werner Vogel, p. 304–307.
"Glasschmelzöfen" by Wolfgang Trier, p. 11.
"Glass–Making Today" by P.J. Doyle.
"History of the Use of $B_2O_3$ in Commercial Glass" by Robert A. Smith, pp. 313–322.

*Primary Examiner*—Stanley S. Silverman
*Assistant Examiner*—Jacqueline A. Ruller
*Attorney, Agent, or Firm*—Hill & Simpson

[57] ABSTRACT

In the manufacturing of high melting point glasses with volatile components, in particular of glasses from the group of boron glasses and borosilicate glasses, a furnace is provided that has a superstructure, fossil fuel burners, and a melting tank. In front of a conditioning zone and a throat leading to an extraction zone, a step-shaped raised area in the bottom is provided which is formed continuously over the complete width of the melting tank. In order to suppress segregation or, respectively, phase separation, to protect the furnace construction materials and to enable problem-free operation, a temperature of at least 1600° C. is produced in the superstructure by means of oxygen-rich oxidation gas, a raised area is provided in the form of a refining bank with a step in front of it, the step being at least 150 mm high and from which at least one row of booster electrodes projects upwards, before the step, the melt flows over at least one row of bubblers located in the bottom, and behind the step, the glass flows in a highly heated state over the refining bank for a distance of 800 mm to 2000 mm, the upper side of said bank being at a maximum distance "T" of 300 mm from the glass bath surface.

27 Claims, 5 Drawing Sheets

METHOD AND APPARATUS FOR MANUFACTURING HIGH MELTING POINT GLASSES WITH VOLATILE COMPONENTS

This is a continuation-in-part of U.S. patent application Ser. No. 08/818,002, filed on Mar. 14, 1997, now abandoned.

BACKGROUND OF THE INVENTION

The invention concerns a method for manufacturing high melting point glasses with volatile components, in particular glasses from the group of boron glasses and borosilicate glasses.

It is stated in the book "ABC Glas" (Dr.-Ing. H.-J. Illig; © Deutscher Verlag für Grundstoffindustrie GmbH, Leipzig; 1991; 2nd edition) on page 36 under the heading "Borosilikatgläser" ("Borosilicate glasses") that boron glasses and borosilicate glasses used for technical applications and for laboratory glassware with high temperature strength have, on the one hand, low coefficients of expansion, but, on the other hand, require high melting temperatures that reach the limits of current furnace design.

The heating of boron glasses and borosilicate glasses results in the volatilization of boron oxides and alkali metal oxides, and in the tendency towards segregation or phase separation (reference: "Glaschemie;" Prof. Dr. W. Vogel; © Springer-Verlag; 1992; 3rd edition; pp. 305–307), and also to recrystallization, all of which are processes which lead to disturbances in the melting process.

Due to these characteristics, most known furnace types cannot be used to melt boron glasses or borosilicate glasses. The best currently available possibility is the basic design of the so-called unit melter, which is a single-chamber furnace with a rectangular furnace tank and a plain crown, from which no intermediate walls extend towards the melt in the heating area.

Furnaces of this type are described in DE-B-2 034 864, in U.S. Pat. No. 2,800,175, in U.S. Pat. No. 2,890,547 and in U.S. Pat. No. 3,353,941. However, it has been shown that without modification, such unit meters are not well-suited for the melting of borosilicate glasses.

The book by Trier, "Glasschmelzöfen—Konstruktion und Betriebsverhalten" (Prof. Dr. W. Trier; © Springer-Verlag; 1984), specifies and illustrates on page 11 a borosilicate furnace that is operated with crown temperatures of 1650° C. and higher, and in which a barrier wall is installed between the melting and refining areas on the one hand and the homogenization area on the other hand. However, there are no indications concerning the length of the barrier wall in the direction of flow or concerning the spacing of the upper edge of the wall from the melt surface. In addition, the wall is disposed behind the refining area and is thus not a refining bank, and is also much too short for adequate refining. Details of unit melters (cross-fired furnaces) are also specified on pages 133 and 154.

A similar melting aggregate is also known from EP-B-0 410 338, in which a step with two rows of bottom electrodes is arranged in front of a barrier wall. However, the wall is not a refining bank because of its short length in flow direction. The step should have a maximum height of 100 mm, which is less than about 15% of the normal glass bath depth of about 800 mm. The step serves only to retain any metals that may be present, in order to avoid short-circuits between the electrodes. Resealable openings in the bottom in front of the step are used to drain such metals. Bubblers are not installed in front of the rows of electrodes. The electrodes create a drum-like circulating flow, whose surface component moves to the charging end of the furnace. In this way, with a reduced furnace temperature, an area of glass bath surface free of batch materials should be produced, and the glass flowing in the direction of the throat should be kept near the glass bath surface for a longer period.

In addition, it is to be remarked that the use of electricity to increase the glass bath temperature for better refining only succeeds effectively if the electricity is introduced in a region where there is no return-current, or only an insignificant return current. A strong circulating current would cause intensive mixing of the glass with other glass which is still being melted, and would thereby seriously jeopardize the temperature increase required for the refining.

From EP-B-0 317 551 and DE-C-39 03 016, it is known to install so-called refining banks in the refining area, above the level of the furnace bottom and to install horizontal electrodes in front of the refining bank in order to increase the refining temperature. However, the melting and refining areas are thereby separated by dividing walls extending downwards from the furnace crown, and these walls extend into the melt and are therefore exposed to high temperature loads, and are provided with cooling channels.

Bubblers can also be provided in the melting areas. However the bubblers have no influence on the processes in the refining area due to the dividing walls. As far as the flow of the melt is concerned, the melting and refining areas are connected with one another by means of narrow bottom throats, i.e. channels that do not extend across the complete width of the melting tank, and in which no return-current forms.

DE-C-39 03 016 thereby also refers to the possibility of processing strongly volatilizing glasses such as opal, lead and boron glasses, without however indicating how segregation and recrystallization could be counteracted.

DE-B-1 210 520 discloses a refining bank that lies higher than the furnace bottom in order to achieve a shallow bath depth, but said refining bank features an additional sill at its beginning, and in front of it a dam that protrudes out of the melt.

The conditions become increasingly unfavorable as the oxygen content in the oxidation gas increases up to a level of technically pure oxygen because the gas temperatures and the reactivity of the gases increase as a result of higher concentrations of contaminants although the gas volumes decrease. By this means, the refractory materials of the furnace and any other connected equipment are jeopardized.

EP 0 086 858 A1 describes a melting furnace for glass known as a "Deep Refiner®", in which a raised bottom area ascends at an angle to a shallow area between the melting area, in which bottom electrodes are installed, and a deeper refining area. However, there is no step or similar device. Vertical circulation currents in the form of several convective flow patterns are produced by bottom electrodes and, if required, additional bubblers installed in the melting zone. Further side wall electrodes are installed above the shallow area to produce the highest furnace temperature at this location. It is also possible to install more electrodes in the deeper refining area. The shallow area acts as an additional refining zone. The melting of high melting point glasses with volatile boron oxides and alkali metal oxides, and in particular of borosilicate glasses, is not described, nor is the supply of oxidation gases to the burners.

FR 2 737 487 A1 reveals a glass melting furnace for flat or float glass manufacture, heated mainly by burners with a high oxygen content. The furnace has an up-stream melting zone and a down-stream refining zone, whereby the bottoms of these zones lie on the same horizontal plane and these zones are of the same depth. Situated between the melting and refining zones, there is a raised bottom with a trapezoidal cross section, although possibly with concave sides, which stretches from side wall to side wall of the furnace. The trapezoidal cross section is described as an important characteristic. As a result of the combined effect of rows of electrodes installed on both sides of the raised bottom area and a row of bubblers installed up-stream of the first row of electrodes, two convective flow patterns of relatively cool glass are produced, which are clearly separated from one another, and between which a hot zone is created by means of bottom electrodes installed vertically above the raised bottom area. The object is to prevent a return flow of glass from the refining zone into the melting zone. The height of the raised bottom area should be a maximum of half, preferably approximately ¼ to ⅓ of the glass bath depth. A shallower glass bath depth across the raised bottom area is expressly excluded, with reference to the possibility of heavy corrosion. The raised bottom area is therefore not a refining bank, over which a horizontal laminar flow is produced in a shallow bath, and in which area the residence time is increased. There is no step present in front of the raised bottom area, in which electrodes are installed. The production volume of the glass, which does not have a high melting point, should lie between 100 and 1000 tonnes per day. The energy requirement for the bottom electrodes is very high, for example 1500 kW. The separating effect of the combination of the raised bottom area and the bottom electrodes is so significant, that it is possible to change the colour of the glass melt in the shortest possible time.

SUMMARY OF THE INVENTION

The underlying aim of the invention is thus to indicate a method and means by which high melting point glasses with volatile components, in particular from the groups of boron glasses and borosilicate glasses, can be reliably melted without disturbance, to produce high quality, by means of oxygen-rich oxidation gases, without significant segregation or phase separation, and with the greatest possible protection of the furnace construction materials.

A solution to the aforementioned problems is provided by the method according to the invention in that a) a temperature of at least 1600° C. is produced in the furnace superstructure by supplying the combustion chamber with oxidation gas containing at least 50% oxygen by volume, b) a raised bottom area in the form of a refining bank with a pre-positioned step is used, which is at least 150 mm high and has a height "H1" which lies between 0.3 and 0.7 times the height of the refining bank "H2", whereby at least one row of booster electrodes projects upwards from the step and is installed across the flow direction of the melt, c) before the step, the melt flows over at least one row of bubblers located in the furnace bottom, and that d) behind the step with the booster electrodes, the melt, which is at a high temperature, flows over the refining bank for a distance of 800 mm to 2000 mm, whereby the upper side of the refining bank is essentially horizontal, and is at a maximum distance "T" of 300 mm from the glass bath surface.

The length of the refining bank in the direction of flow is determined according to the average residence time of the glass on the refining bank at full melting load of the furnace. This residence time is governed by the time required for the refining process, and the length of the refining bank can be calculated from the throughput and the cross sectional area of the glass flow, i.e. from the flow velocity.

Preferentially, a temperature of at least 1650° C. is achieved at stage a).

The aim of the present invention is achieved by the described method. Given a furnace design for e.g. 40 t/day, and given a glass bath surface of 12200 mm×3800 mm, with the use of technically pure oxygen as an oxidation gas even chamber temperatures of 1680 to 1700° C. can be reached unproblematically. The formation of cristobalite, which can ensue by means of the volatilization of e.g. $B_2O_3$, is thereby effectively counteracted by the melting of the crystals.

The row of bubblers and the step with the booster electrodes separate the currents in the melting area from the refining bank, without requiring any dividing walls, dams, barrier walls or the like that extend down into the melt. In the tests that were conducted, six bubblers and six booster electrodes were installed in individual rows across the inside distance of 3800 mm between the furnace side walls.

The refining of the glass melt is carried out above the refining bank in a region where the glass bath is shallow. Here, the melt reaches the high temperature required for intensive refining, and consequently achieves the most advantageous viscosity.

The relatively high flow velocity, averaging of 1 m/h in the indicated design, prevents any noticeable $B_2O_3$ volatilization across the refining bank, so that the formation of cords and streaks, which are typical for the glasses concerned, is practically prevented. Behind the refining bank, the clear melt flows into a conditioning chamber, from which the distribution into the forehearths can take place. The content of oxides of nitrogen of the waste gases is well beneath the boundary value required by regulations or statutes.

It is thereby particularly advantageous if the following conditions are met, either individually or in combination:

A step is used whose height "H1" lies between 0.4 and 0.6 times the height "H2" of the refining bank;

The melt is conducted over the refining bank with an average residence time of 0.5 to 2.0 hours;

The melt is conducted over the refining bank with an average residence time of 1.0 to 1.5 hours;

The melt is conducted in the melting area over a group of bottom electrodes. In tests, an arrangement of 12 bottom electrodes in three rows has turned out to be optimal, whereby the distance between the rows increases in the direction of the bubbler, in order to provide more energy in the area where more is needed for melting. Moreover, the individual groups of electrodes can also be individually supplied with power, even perpendicular to the axis of the furnace, in order to be able to counteract an asymmetry in the transverse direction of the furnace, and achieve a symmetrical temperature distribution.

The invention is intended to prevent the booster electrodes from creating circulating currents and to supply the energy from the booster electrodes to the refining bank. Care is thereby to be taken that the distance of the bubblers to the front edge of the step is chosen to correspond with the depth of the bath and the height of the refining bank, as well as to the gradient of the viscosity curve or the temperature gradient between the surface and the bottom glass. Under normal circumstances, this distance is selected approximately equal to the bath depth.

The bubblers cause a circulating current, whereby glass is drawn up from below and transported to the surface of the glass bath. Colder glass will thereby sink again more rapidly than the hotter glass. Within the circulating current, in particular in the direction of the glass flow, there is a separation of the hot and the cold glass. The edge of the step thereby acts as a current splitter, so that the colder glass sinks down, flows again into the base of the bubblers, and, as a result of the mixing effect, is again conducted partly in the flow direction in front of the bubblers.

The hotter glass, which flows above the edge of the half-height step, has a higher temperature. In addition, as a result of the fact that the flow cross-section is much smaller here than in the normal glass bath, the return current from this area is already considerably reduced.

By means of the installation of a row of electrodes on this step, which appropriately consists of six electrodes in a row, whereby the phases are named "R-S-T/R-S-T," a relatively uniform heating of the glass is achieved on this step, combined with an upward current, which ensures that at least part of the glass is transported to the surface at this location without there being a significant return current into the melting area. It is, of course, possible to supply each electrode with a single phase current.

In this way, it is possible to use the booster electrodes to bring the glass flowing to the actual refining bank to a desired temperature. This is very important in particular for borosilicate glass, because this type of glass requires higher refining temperatures than are necessary for soda-lime glass. However, on the other hand, when it is necessary to transfer a lot of energy into the glass bath from above to reach this temperature, the volatilization rates are significantly higher than when this takes place according to the invention, by means of electrodes.

The amount of energy required to raise a quantity of glass to a particular temperature is relatively low, as a result of the low specific heat of the glass, which is 1.26 kJ/kg °C. in this temperature range. The surface of the electrodes must thus not be very large, since, as stated, the overall amount of energy introduced by the electrodes is relatively small.

However, it is important that a uniform distribution of the electrodes over the cross-section be given in order to achieve an upward current everywhere. This can be achieved essentially better with bottom electrodes installed in a row than with side wall electrodes. It has been shown that the return current is slowed again, due to the fact that the electrodes cause an upwards motion over the step, so that only comparatively low amounts of glass are transported back into the bubbler area.

The invention also concerns a glass melting furnace for manufacturing high melting point glasses with volatile components, in particular, glasses such as boron glasses and borosilicate glasses, with a longitudinal furnace axis (A—A), a superstructure with a combustion chamber without internal dividing walls, with fossil fuel burners and with a melting tank that has a melting area, and which has a furnace bottom and, a step-shaped raised area on the bottom, which goes continuously across the complete width of the melting tank and which is situated in front of a conditioning zone and a throat to an extraction point.

A glass melting furnace of the present invention is characterized in that
  a) the raised bottom area is a refining bank with a step in front that is at least 150 mm high, and whose height "H1" is between 0.3 and 0.7 times the height "H2" of the refining bank, whereby at least one row of booster electrodes projects upwards from the top surface of the step and perpendicular to the longitudinal axis (A—A) of the furnace,
  b) at least one row of bubblers, located in the furnace bottom, is installed in front of the step, and
  c) the refining bank comprises a length "L2" between 800 and 2000 mm along the longitudinal axis (A—A) of the furnace and there is a distance "T" of maximum 300 mm between the top of the refining bank and the nominal glass bath surface.

Preferably, the distance "T" of the horizontal upper surface of the refining bank from the nominal melting bath surface is between 100 mm and 175 mm, and the length "L2" of the refining bank in the direction of the furnace longitudinal axis (A—A) is between 1000 mm and 1500 mm.

Preferably, the ratio of the length "L1" of the step to the length "L2" of the refining bank—seen respectively in the direction of the furnace longitudinal axis (A—A)—is between 0.4 and 0.6.

Preferably, the axes of a row of booster electrodes lie on a straight line, which is at a distance "L3" from the front edge of the step whereby "L3" ranges from about 0.4 to about 0.6×"L1".

Preferably, the booster electrodes consist of groups of three, each group being supplied with three-phase current, and with the electrical connection sequence being "R-S-T," or alternatively, the electrodes can be supplied with single phase-currents.

Preferably, the bubblers are spaced at a distance "d" from one another whereby "d" ranges from 300 mm to 600 mm, and the bubbler row is at a distance "L4" from the front edge of the step, whereby "L4" ranges from 0.3 to 0.6×"L1".

Preferably, the glass melting furnace is a cross-fired design.

Preferably, a group of bottom electrodes is installed in the melting end.

The distance or density of the bubblers and booster electrodes among themselves per length unit (perpendicular to the direction of flow of the melt), and the distance of the row(s) of bubblers from the step or refining bank (in the direction of flow of the melt) can be determined experimentally.

Other objects and advantages of the present invention will become apparent from reading the following detailed description and appended claims, and upon reference to the accompanying drawings.

BRIEF DESCRIPTION OF THE DRAWINGS

An exemplary embodiment of the subject matter of the invention is subsequently explained on the basis of FIGS. 1 to 5.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
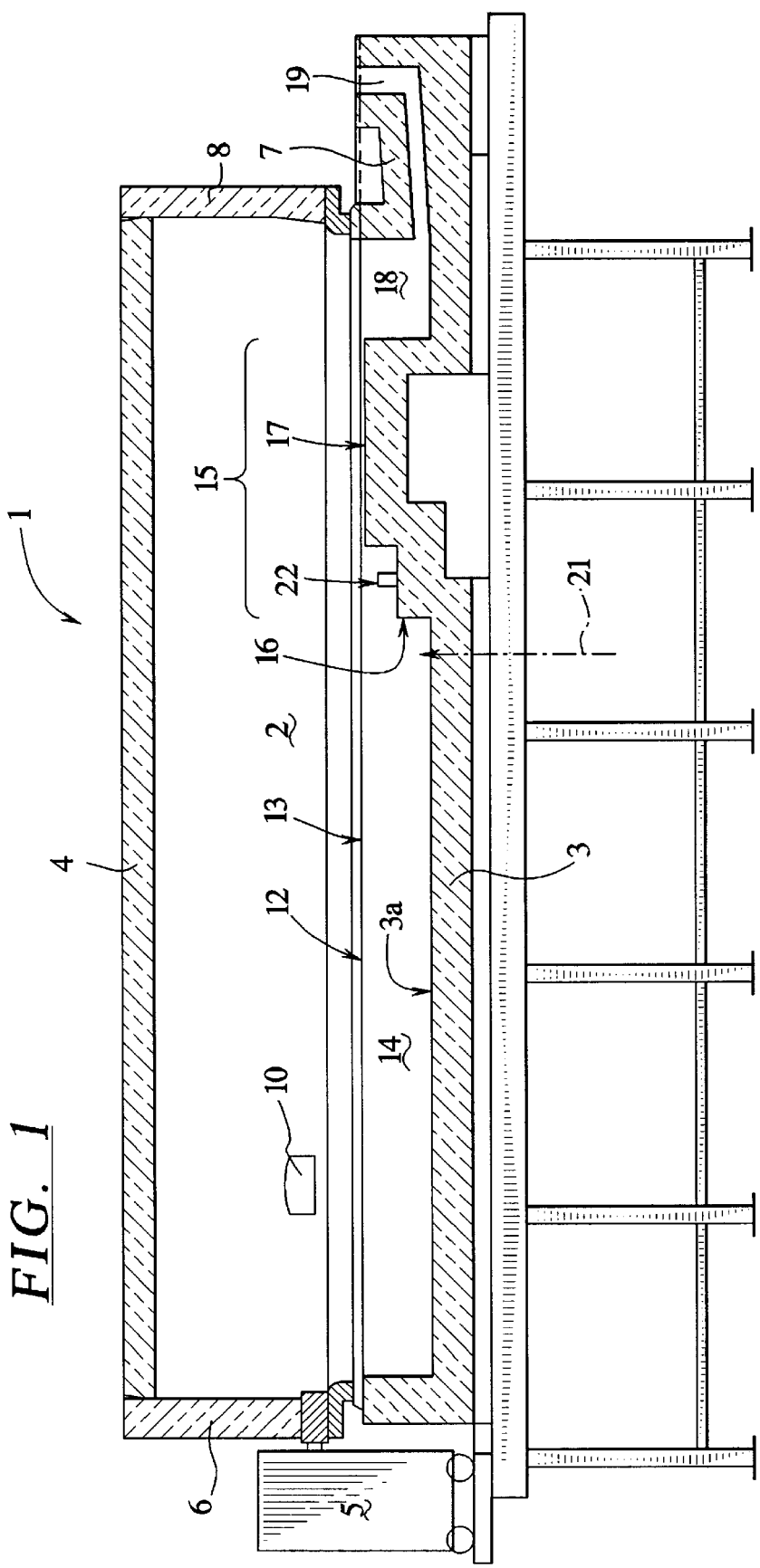
FIG. 1 is a vertical longitudinal section view of the furnace along the furnace longitudinal axis A—A in FIG. 2.
Figure 2:
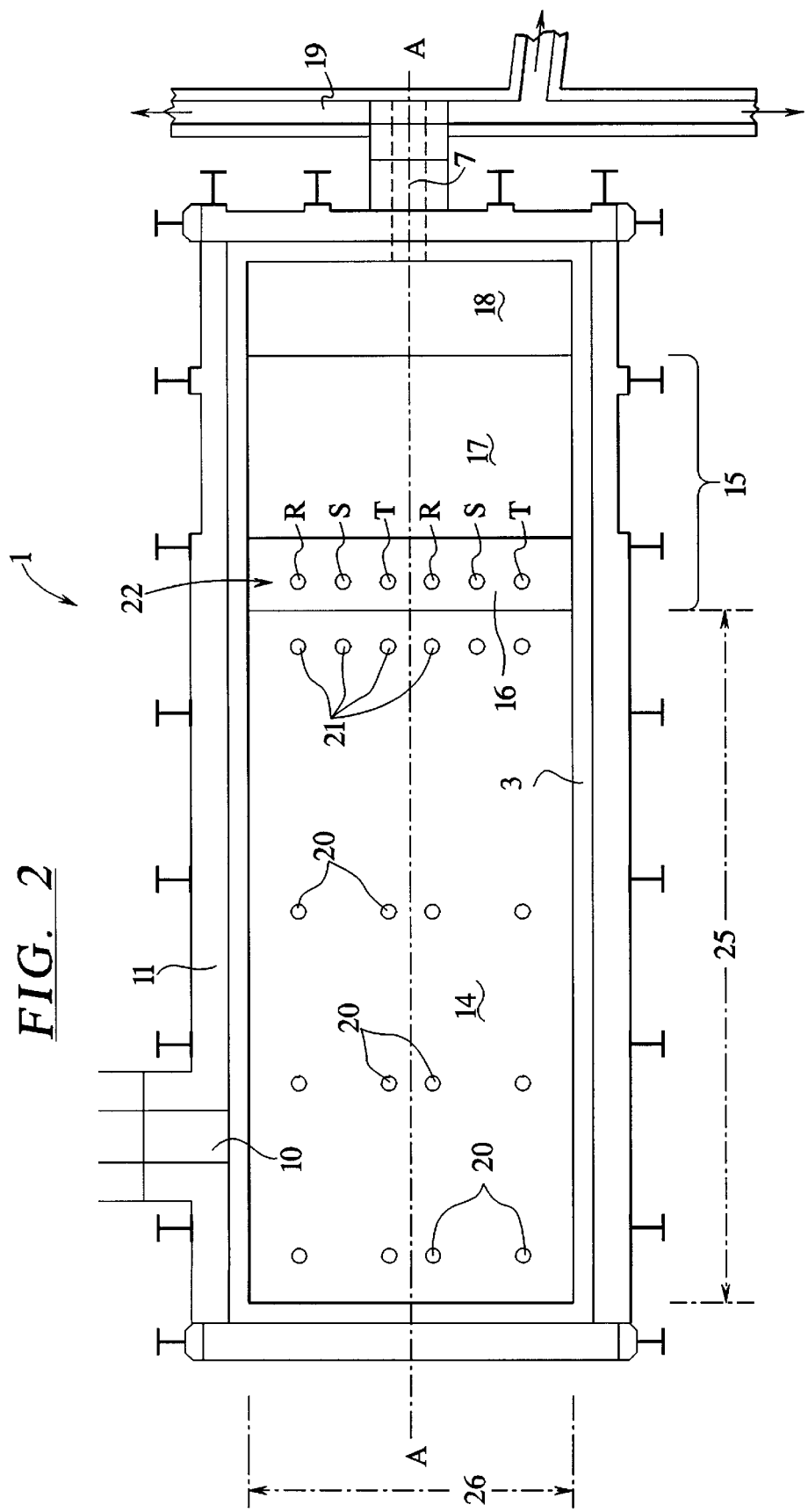
FIG. 2 is a top plan view of the melting end of the furnace shown in FIG. 1, with the superstructure removed.

FIGS. 1 and 2 show a furnace 1, which has a melting tank 3 and a superstructure 4 with a combustion chamber 2. This is bounded on the charging side with a batch charger 5 by means of a first end wall 6, and on the extraction side with a throat 7, by means of a second end wall 8. Rows of burners 9 are located in the side walls, some of which burners are shown schematically in FIGS. 3, 4 and 5. The combustion gases escape through an opening 10 in one of the side walls 11, and thus move in counterflow to a glass melt 12 with a glass surface 13, and to the charging material floating thereon. As shown, the superstructure 4 is smooth below the crown roof, in the manner of a unit melter, and thus has no inner dividing walls.

The melting tank 3 has a flat bottom 3a at the beginning and is rectangular, and comprises from left to right the following regions or partial sections: a melting area 14, which is followed by a raised bottom area 15, which comprises a step 16 and a refining bank 17, which both extend over the complete width of the melting tank 3 (FIG. 2). On the other side of the raised bottom area 15, there is a conditioning zone 18, from which the throat 7 leads to an extraction zone 19, which is connected to forehearths (not shown here), at whose ends extraction points are located (see the arrow at the right side of FIG. 2). The melting area 14 of the melting tank 3 is defined by width 26 and length 25 as shown in FIG. 2.

Figure 3:
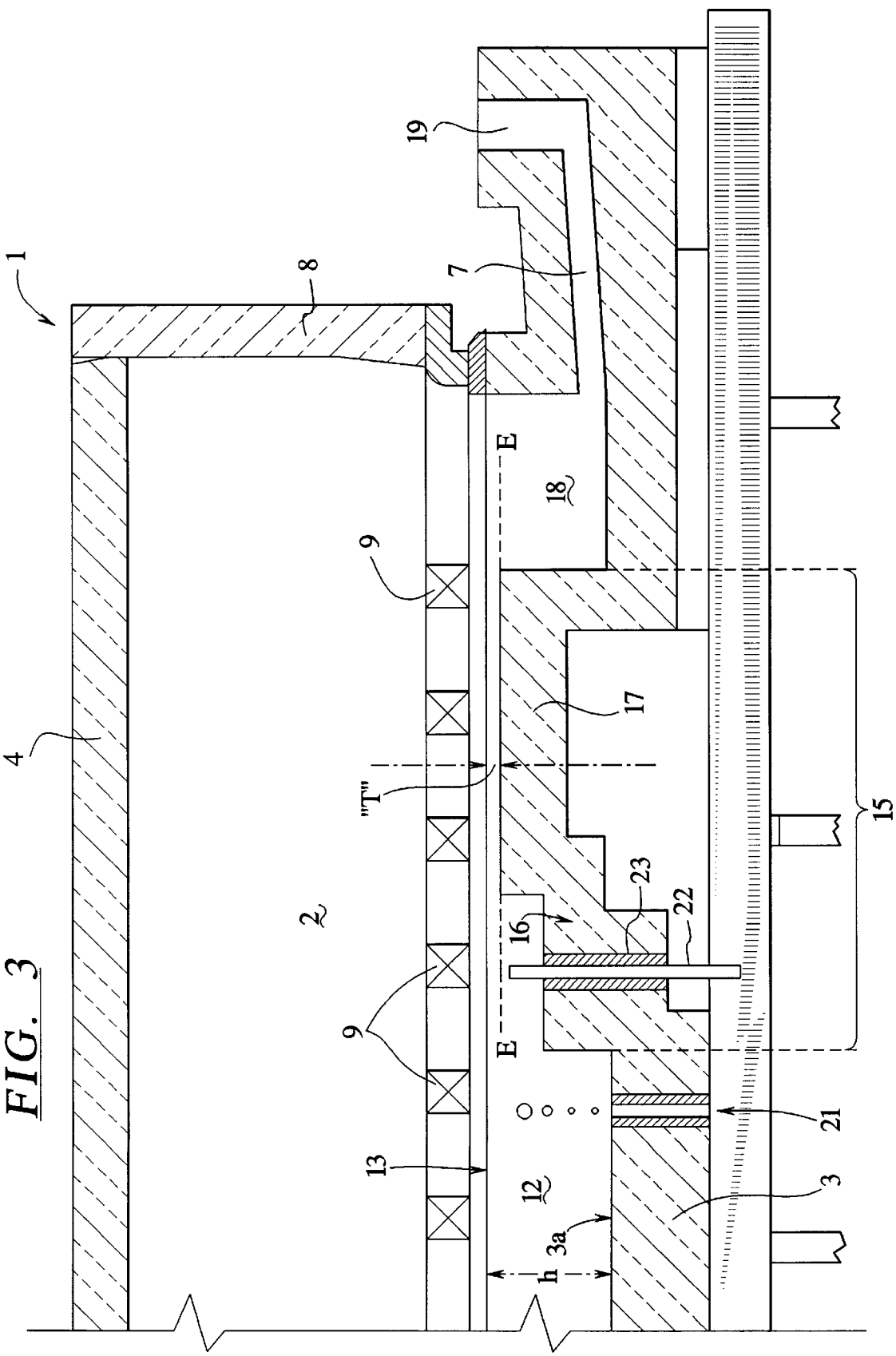
FIG. 3 is an enlarged view of the right hand part of the furnace shown in FIG. 1.
Figure 4:
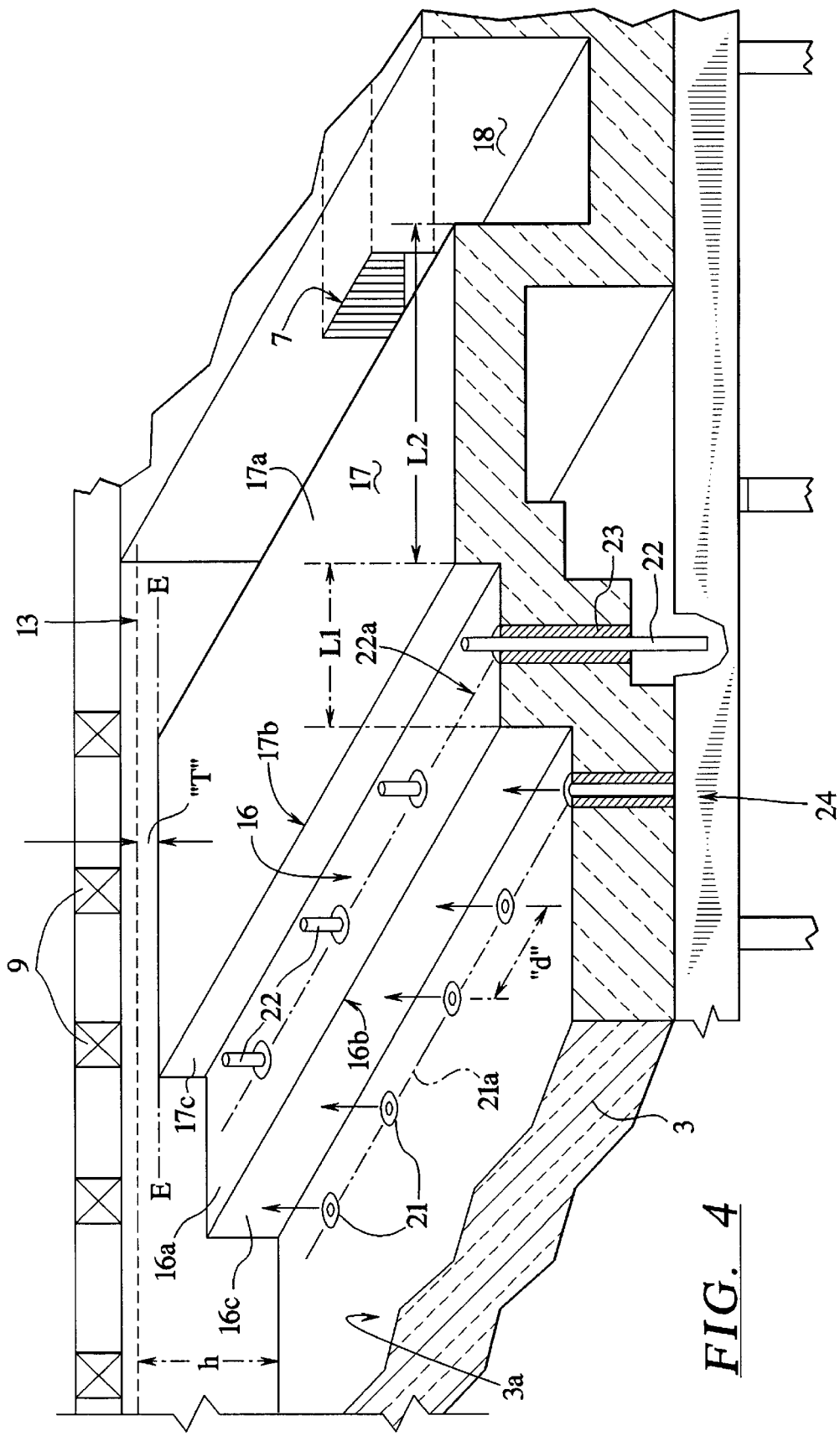
FIG. 4 is a partial perspective view of the furnace shown in FIG. 1.
Figure 5:
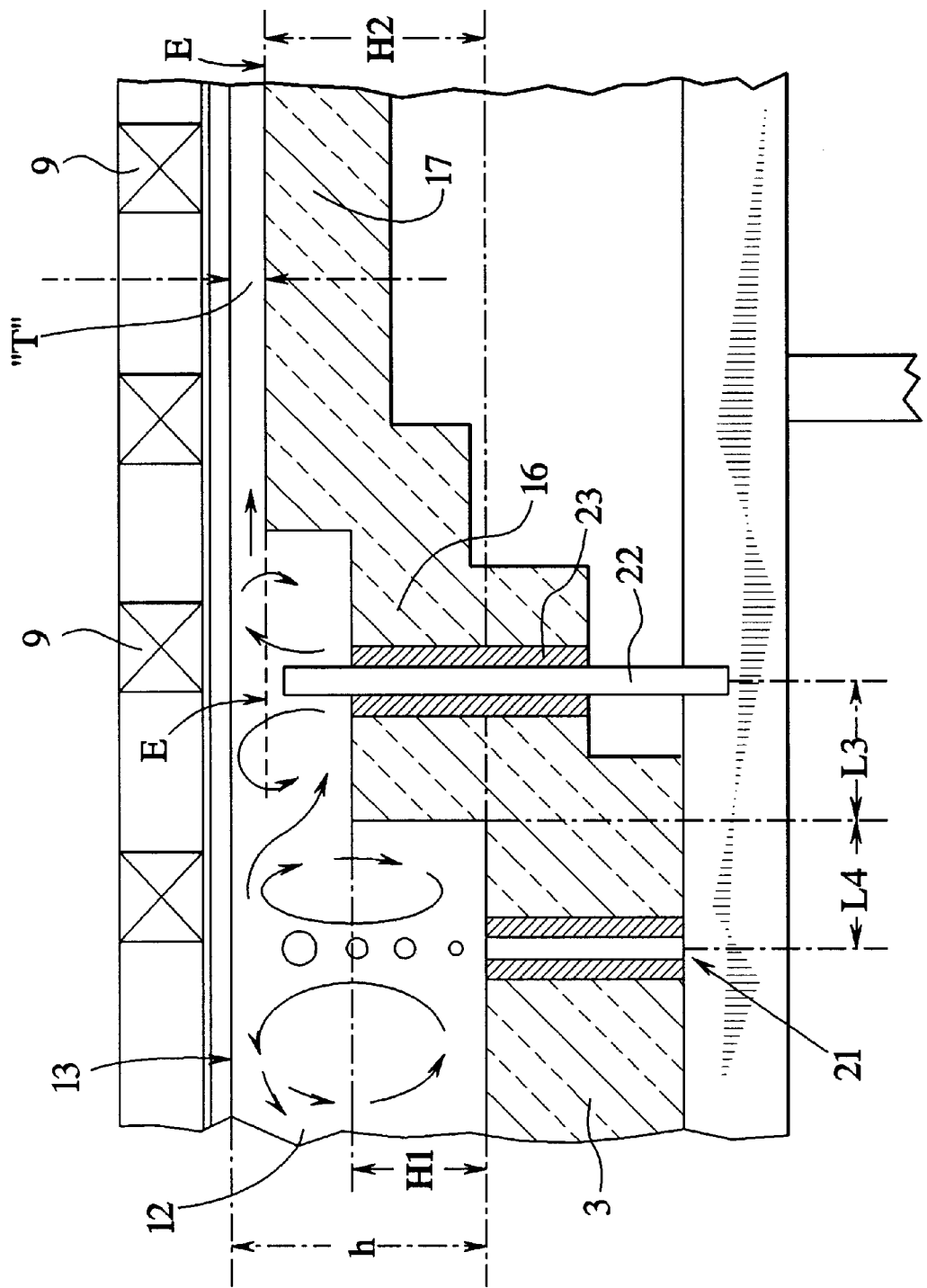
FIG. 5 is another enlarged view of the right hand part of the furnace shown in FIG. 1.

The upper faces 16a and 17a of the step 16 and the refining bank 17 are formed by horizontal flat surfaces, of which the plane E—E is particularly highlighted in FIGS. 3, 4 and 5. The step 16 and the refining bank 17 have straight front edges 16b and 17b and vertical front faces 16c and 17c (FIG. 4).

In the melting area 14, three rows of four bottom electrodes 20 each are located, whereby these rows run perpendicular to the furnace longitudinal axis A—A, and the distances apart of the rows increase in the direction of flow (from left to right). The contour lines of the outer electrodes form a "field." In front of the step 16, a row of six bubblers 21 is located in the bottom 3a, and six booster electrodes 22, phased in the sequence "R-S-T/R-S-T" (FIG. 2), project upwards from the top 16a of the step 16. The booster electrodes can also be connected to three single phase transformers.

The following can be seen more clearly in FIGS. 3 and 4: the booster electrodes 22 project vertically upwards from each cooled holder 23 to just below the plane E—E; however, they can also extend beyond this plane, and can even reach up to the glass surface 13. The glass bath depth "h" is e.g. 800 mm; the distance "T" between the plane E—E and the glass bath surface is e.g. 125 mm, i.e. the refining bank 17 has a height "H2" of 675 mm. The step 16 in front of it has a height "H1" of e.g. 400 mm (FIG. 5).

FIGS. 4 and 5 additionally show the following: the equidistantly distributed bubblers 21 lie on a straight line 21a (dot-dash line), and are at distances of 300 mm to 600 mm from one another, and the line 21a is at a distance "L4" of about 0.5×"L1" from the front edge 16b of the step 16. The booster electrodes 22, which are likewise distributed equidistantly, lie on a straight line 22a (dot-dash line), and have similar distances from one another. The line 22a lies in the middle of the step 16 and has a distance "L3" of about 0.5×"L1" from the front edge 16b of the step 16, but in the opposite direction.

The row of bubblers 21 produces, among other things, a strong circulating current in the direction of the charging end of the furnace 1, and thereby prevents the penetration of unmelted charging material into the area of the step 16. However, the bubblers 21 have a smaller influence on the flow over the step 16. At this point, the booster electrodes 22 are effective as a result of their own convection currents, and as the bubblers 21 have only a small influence on the flow, the electrodes 22 heat the glass over the step 16 strongly, so that this melt flows to the refining bank 17 where it is well refined without the necessity for excessive fossil fuel heating.

This shielding effect is stronger the higher the step above the furnace bottom 3a (dimension "H1") is in relation to the height of the refining bank over the furnace bottom 3a (dimension "H2"). The height "H1" of the step is limited to 0.7×the height "H2" by the fact that a (small) quantity of glass must still be present above the step, in which the booster electrodes can work effectively. The gas connections for the bubblers 21 and the electrical connections for the booster electrodes 22 have been omitted for the sake of clarity.

List of Reference Characters

1 Furnace
2 Combustion chamber
3 Melting tank
3a Furnace bottom of melting tank
4 Superstructure
5 Batch charger
6 First end wall
7 Throat
8 Second end wall
9 Burner
10 Opening
11 Side walls
12 Glass bath
13 Glass surface
14 Melting area
15 Raised bottom area
16 Step
16a Upper face
16b Front edge
16c Front face of step
17 Refining bank
17a Upper face
17b Front edge
17c Front face of refining bank
18 Conditioning zone
19 Extraction zone
20 Bottom electrode
21 Bubbler
21a Line
22 Booster electrodes
22a Line
23 Holder
25 Length of melting tank
26 Width of melting tank
H1 Height of step
H2 Height of refining bank From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A method for manufacturing high melting point glasses comprising:

heating glass in a furnace to form a melt, the furnace comprising
a superstructure having a combustion chamber, the combustion chamber defining an uninterrupted space without inner dividing walls, the combustion chamber accommodating a plurality of burners,
the furnace further comprising a melting tank with a melting area, the melting tank further comprising a furnace bottom disposed underneath the melting area, the furnace bottom being connected to a raised bottom area, the furnace bottom further comprising at least one row of bubblers extending across the width of the melting tank and underneath the melting area,
the raised bottom area extending across the width of the melting tank, the raised bottom area being disposed between the melting area and a conditioning zone, the conditioning zone being disposed between the raised bottom area and a throat, the throat being disposed between the conditioning zone and an extraction zone,
the raised bottom area comprising a refining bank having a top and a height defined as a vertical distance between the furnace bottom and the top of the refining bank, the raised bottom area further comprising a step disposed between the refining bank and the melting area, the step having a top and a height defined by a vertical distance between the furnace bottom and the top of the step, the height of the refining bank being greater than the height of the step, the step further comprising a row of booster electrodes spaced along the step in the direction of the width of the melting tank and transverse to the length of the melting tank, flowing the melt from the melting area over the at least one row of bubblers and towards the step, flowing the melt over the step and towards the refining bank and heating the melt with a row of booster electrodes, the melt further having a top surface and a height defined as a vertical distance between the furnace bottom and the top surface of the melt, the height of the step being between 0.3 and 0.7 times the height of the melt, flowing the melt over the refining bank and towards the conditioning zone.

2. The method of claim 1 wherein the glasses are further characterized as being selected from the group consisting of boron glasses and borosilicate glasses.

3. The method of claim 1 wherein the combustion chamber is heated to a temperature of at least 1600° C.

4. The method of claim 1 wherein the combustion chamber is supplied with an oxidation gas containing at least 50% oxygen by volume.

5. The method of claim 1 wherein the booster electrodes extend vertically upward from the step.

6. The method of claim 1 wherein the height of the step ranges from about 0.4 to about 0.6 times the height of the refining bank.

7. The method of claim 1 wherein the top of the refining bank has a length from about 800 mm to about 2000 mm and the top of the refining bank being essentially horizontal and being disposed less than 300 mm below the top surface of the melt.

8. The method of claim 1 wherein the melt flows over the refining bank with an average residence time ranging from about 0.5 hours to about 2.0 hours.

9. The method of claim 1 wherein the melt flows over the refining bank with an average residence time ranging from about 1.0 hour to about 1.5 hours.

10. The method of claim 1 wherein the furnace bottom further comprises a field of bottom electrodes disposed below the melting area.

11. The method of claim 1 wherein the combustion chamber further comprises at least one opening for permitting the exit of waste gases from the furnace in a direction that is opposite to the flow of the melt.

12. A furnace for manufacturing high melting point glasses, the furnace comprising:

a superstructure having a combustion chamber disposed over a melting tank, the combustion chamber defining an uninterrupted space without inner dividing walls, the combustion chamber accommodating a plurality of burners, the melting tank comprising a melting area, the melting tank further comprising a furnace bottom disposed underneath the melting area, the furnace bottom being connected to a raised bottom area, the raised bottom area extending across the width of the melting tank, the furnace bottom further comprising a row of bubblers extending across the width of the melting tank and in front of the raised bottom area, the raised bottom area being disposed between the melting area and a conditioning zone, the conditioning zone being disposed between the raised bottom area and a throat, the throat being disposed between the conditioning zone and an extraction zone, the raised bottom area comprising a refining bank having a top and a height defined as a vertical distance between the furnace bottom and the top of the refining bank, the raised bottom area further comprising a step disposed between the refining bank and the melting area, the step having a top and a height defined by the distance between the furnace bottom and the top of the step, the height of the refining bank being greater than the height of the step and is at least 150 mm, the step further comprising at least one row of booster electrodes spaced along the step in a direction parallel to the width of the melting tank and transverse to the length of the melting tank.

13. The furnace of claim 12 wherein the combustion chamber is capable of being heated to a temperature of at least 1600° C.

14. The furnace of claim 12 wherein the height of the step ranges from about 0.3 to about 0.7 times the height of the refining bank.

15. The furnace of claim 14 wherein the top of the step has a length along the longitudinal axis of the furnace and the top of the refining bank has a length along the longitudinal length of the furnace, a ratio of the length of the step to the length of the refining bank ranging from 0.4 to 0.6.

16. The furnace of claim 15 wherein the refining bank comprises a length ranging from about 800 mm to about 2000 mm along the longitudinal axis of the furnace.

17. The furnace of claim 15 wherein the refining bank comprises a length extending along the longitudinal axis of the furnace, the length of the refining bank ranging from about 1000 mm to about 1500 mm.

18. The furnace of claim 12 wherein at least one row of booster electrodes extend vertically upwards from the step.

19. The furnace of claim 12 wherein the furnace bottom further comprises a plurality of bottom electrodes disposed below the melting area.

20. The furnace of claim 15 wherein the step has a front edge, the booster electrodes are spaced from the front edge at a uniform distance which is from 0.4 to 0.6 times the length of the step.

21. The furnace of claim 12 wherein the step further comprises a vertical front face and a horizontal top surface.

22. The furnace of claim 12 further comprising three groups of booster electrodes, each group being supplied with three-phase current.

23. The furnace of claim 12 wherein each booster electrode is connected to single phase transformers.

24. The furnace of claim 15 wherein the bubblers are spaced at a minimum distance from the front surface of the step, this distance ranges from 0.3 to 0.6 times the length of the step.

25. The furnace of claim 12 further comprising a plurality of bottom electrodes disposed in the melting area.

26. The furnace of claim 12 further comprising at least one waste gas outlet for waste gases from the combustion chamber.

27. A furnace for manufacturing boron glasses and borosilicate glasses having volatile components, the furnace comprising:

a superstructure having a combustion chamber disposed over a melting tank, the combustion chamber defining an uninterrupted space without inner dividing walls, the combustion chamber accommodating a plurality of burners, the furnace further comprising a melting tank with a melting area, the melting tank having a length extending along a longitudinal axis of the melting tank and a width extending transversely to the longitudinal axis of the melting tank, the melting tank further comprising a furnace bottom disposed underneath the melting area, the furnace bottom comprising a field of electrodes and at least one row of bubblers disposed below the melting area, the furnace bottom being connected to a raised bottom area, the raised bottom area extending across the width of the melting tank, the raised bottom area being disposed between the melting area and a conditioning zone, the conditioning zone being disposed between the raised bottom area and a throat, the throat being disposed between the conditioning zone and an extraction zone, the raised bottom area comprising a refining bank having a top and a height defined as a vertical distance between the furnace bottom and the top of the refining bank, the refining bank comprising a length ranging from about 800 mm to about 2000 mm along the longitudinal axis of the furnace, the raised bottom area further comprising a step disposed between the refining bank and the melting area, the step having a height defined by the distance between the furnace bottom and the top of the step, the height of the step ranging from about 0.3 to about 0.7 times the height of the refining bank, the step further comprising a length disposed along the longitudinal axis of the furnace, a ratio of the length of the step to the length of the refining bank ranging from about 0.4 to about 0.6, the step further comprising at least one row of booster electrodes spaced along the step in the direction of the width of the melting tank and transverse to the length of the melting tank, the booster electrodes extend vertically upwards from the step.

* * * * *